US006774889B1

(12) United States Patent
Zhang et al.

(10) Patent No.: US 6,774,889 B1
(45) Date of Patent: Aug. 10, 2004

(54) SYSTEM AND METHOD FOR TRANSFORMING AN ORDINARY COMPUTER MONITOR SCREEN INTO A TOUCH SCREEN

(75) Inventors: Zhengyou Zhang, Redmond, WA (US); Ying Shan, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 272 days.

(21) Appl. No.: 09/696,251

(22) Filed: Oct. 24, 2000

(51) Int. Cl.[7] .................................................. G09G 5/00
(52) U.S. Cl. ....................... 345/173; 345/156; 178/18.1
(58) Field of Search ................................. 345/156, 157, 345/158, 9, 169, 173, 863, 865, 178, 181; 178/18.1; 382/168–172

(56) References Cited

U.S. PATENT DOCUMENTS

| | | | | |
|---|---|---|---|---|
| 4,646,073 A | * | 2/1987 | Fukunaga et al. | 340/709 |
| 4,845,346 A | * | 7/1989 | Ouchi et al. | 250/221 |
| 5,317,140 A | * | 5/1994 | Dunthorn | 250/221 |
| 5,528,263 A | * | 6/1996 | Platzker et al. | 345/156 |
| 5,630,037 A | * | 5/1997 | Schindler | 359/131 |
| 5,936,615 A | * | 8/1999 | Waters | 345/173 |
| 5,940,065 A | * | 8/1999 | Babb et al. | 345/178 |
| 6,008,800 A | * | 12/1999 | Pryor | 345/173 |
| 6,137,491 A | * | 10/2000 | Szeliski | 345/419 |
| 6,320,978 B1 | * | 11/2001 | Szeliski et al. | 382/154 |
| 6,348,918 B1 | * | 2/2002 | Szeliski et al. | 345/419 |
| 6,421,042 B1 | * | 7/2002 | Omura et al. | 345/157 |
| 6,577,299 B1 | * | 6/2003 | Schiller et al. | 345/179 |

OTHER PUBLICATIONS

T. Starner, S. Mann, B. Rhodes, J. Levine, J. Healey, D. Kirsch, R.W. Picard and A. Pentland. Augmented Reality through Wearable Computing, Presence, Special Issue on Augmented Reality, 6(4), 1997.
Coutaz, Crowley, J.L. and F. Berard. Things that See: Machine Perception in Human Computer Interaction. Communications of the ACM, 43(3): 54–64, 2000.

* cited by examiner

Primary Examiner—Regina Liang
Assistant Examiner—Jennifer T. Nguyen
(74) Attorney, Agent, or Firm—Lyon & Harr, LLP; Katrina A. Lyon

(57) ABSTRACT

A system and method for turning a regular computer monitor screen into a touch screen using an ordinary camera. It includes an image-screen mapping procedure to correct for the non-flatness of the computer screen. It also includes a segmentation method to distinguish the foreground, for example an indicator such as a finger, from the background of a computer screen. Additionally, this system and method includes a robust technique of finding the tip point location of the indicator (such as the finger tip). The screen coordinates of the tip point are then used to control the position of the system indicator.

15 Claims, 7 Drawing Sheets

SYSTEM AND METHOD FOR TRANSFORMING AN ORDINARY COMPUTER MONITOR SCREEN INTO A TOUCH SCREEN

BACKGROUND OF THE INVENTION

1. Technical Field

This invention is directed towards a system and method for transforming a computer monitor screen into a touch screen using an ordinary camera.

2. Background Art

Input devices for use in computer environments are known in the art. They are used to input data into a computer based system. Such data may be used to navigate a cursor on a display, to control the functions of a certain device or to simply input information to a system.

An input device may comprise a touch screen. A "touch" on a typical touch screen means that the touch screen senses the presence of an object such as a tip of a finger or another object, for example a stylus, at and/or at a small distance from an active surface area of the touch screen. An output signal which, in general, is either an electrical or an optical signal is generated from the touch screen. The output signal may include information which is directly dependent on the position of the "touch" on the touch screen. In this case the output signal may include information of the x and y coordinates of the "touch" on the touch screen. Alternatively, the active surface area may be arranged into predetermined regions and, when a particular region is "touched", the output signal may then depend on a unique identification code which refers to that particular region. Touch screens are more convenient than conventional computer screens because the user can directly point to an item of interest on the screen instead of having to use a mouse or other pointer. Use of a mouse or pointer requires learning hand to eye coordination to effectively move the cursor on the screen. Touch screens are particularly useful for children's software programs because it takes children a long time to master the use of a mouse. Conventional touch screens are, however, expensive and difficult to manufacture, making them impractical for many applications.

SUMMARY

The present invention overcomes the aforementioned limitations in prior touch screens by a system and method that turns a regular computer monitor screen into a touch screen using an ordinary camera. This system and method includes an image-screen mapping procedure to correct for the non-flatness of the computer screen. It also includes a segmentation method to distinguish the foreground, for example an indicator such as a finger, from the background of a computer screen. Furthermore, it also includes a robust method of finding the tip point location of the indicator (such as the finger tip).

The system setup is very simple as it essentially involves only positioning a camera so as to view the screen of a computer monitor. Ideally, the camera views the screen from a point along a line normal to the center of the screen. However, as this will likely interfere with the user who typically sits in front of the computer monitor, the camera can be shifted away from the normal line to get it out of the way of the user. The camera cannot be moved too far away from the normal line, however, or errors will be introduced in the process which is to be described shortly.

There are four major functional parts to the system and method according to the present invention. These are calibration, extraction of a background model, extraction of a foreground model and a main processing block. The main functional block is the kernel of the system. Its function is to locate the tip point of the indicator in an image of the screen and map its image coordinates to the screen coordinates. To do this the indicator is first segmented from the background. Then the tip point of the indicator is found. The segmentation process requires that color models for both the background and the indicator be calculated. During calibration the mapping between the image coordinates and the screen coordinates is established. This mapping is then used in the main functional block to find the corresponding screen coordinates for the tip point once its image coordinates are estimated. The screen coordinates of the tip point are then used to control the position of the system indicator, sometimes referred to as a cursor.

The purpose of the calibration procedure is to establish a projective mapping between the image coordinates and the screen coordinates. If the screen is flat, the plane perspectivity from the screen plane and its two dimensional (2D) projection on the image plane is described by a homography, i.e., a 3×3 matrix defined to a certain scale. This homography can be used to map the image coordinates to the screen coordinates and can easily be determined from four pairs of image-screen correspondences. These correspondences are not difficult to obtain because the screen coordinates can be chosen as the four corners of the screen and their corresponding image points can either be detected automatically or can be specified by the user.

Most computer monitor screens are not flat, however. To correct for the curvature of the screen, a homography is computed as before. Since the screen is not actually flat, the computed homography is just an approximation. Then a series of dots forming a grid (referred to as calibration points hereafter) whose center coordinates are known in the screen plane are displayed on the screen. Preferably, this is done one at a time in sequence (e.g., from left to right starting with the top row of the grid). A dot on the screen is usually projected in the image plane as an ellipse and the centroid of an ellipse can easily be computed. The centroid of the ellipse can be considered to be the projection of the center of the corresponding dot. As each calibration point appears on the screen, an image of the screen is captured. The ellipse representing the dot in the image is found in the image and the coordinates of its centroid are calculated. It is noted that this can be accomplished using standard techniques for segmenting foreground pixels, including the color segmentation procedure that will be discussed later. The search of the image can be limited to a region of the image surrounding the point where the center of the displayed dot is likely to be seen based on previously derived homograph. The centroid of the ellipse representing the displayed dot in the camera image is then mapped back to the screen coordinates also using the previously computed homograph. These mapped points are called estimated calibration points. Each estimated calibration point is compared to the screen coordinates of the original calibration point. The difference between the original and the estimated calibration points defines a residual vector. Once each dot is displayed and analyzed, the result is a grid of residual vectors. Bilinear interpolation is then used to compute the residual vectors of all screen points (e.g., pixels) not on the grid. The resulting residual vector field is used to compensate for mapping errors caused by the curvature of the screen for all points on the screen. Finally, it is noted that while the foregoing procedure need not be implemented if a flat or nearly flat screen is involved, it may still prove advantageous to do so.

Since the homography is computed using just four point correspondences, any inaccuracies in the point coordinates will result in an inaccurate homography. The foregoing compensation procedure corrects for any inaccuracies because many more points are compared.

The aforementioned procedures for extracting a background and foreground model preferably employ a color segmentation technique. Sometimes it is difficult to separate the indicator from the background screen. However, it has been observed during experimentation, that images of screen pixels have some degree of invariance in the color space—they are dominated by blue colors. This observation forms the base of the segmentation procedure described as follows.

The color segmentation procedure first computes a color model for the screen without the indicator (e.g., finger, pen, etc.). This is done by capturing an image of the screen while it displays the colors typical of the screen images used in the program for which the present invention is being used to simulate a touch screen. The captured image is used to compute a background model for the screen. To compute this background model all of the pixels in the image are histogrammed—namely, for each pixel its color intensity is placed in the proper bin of a preferred possible 256 intensity levels. This is preferably done for each of the red, green and blue (RGB) channels thus generating three separate histograms. Alternately, one histogram could be generated using some joint space representation of the channels. Once the histogramming has taken place, a Gaussian distribution for each histogram is calculated to provide the mean pixel intensity of the background and the variance therefrom. This information is useful for determining which pixels are background pixels.

Once the modeling of the background of the screen has been completed, the model for the indicator or pointer is computed in order to separate the indicator from the background. This is done by asking the user to select a polygonal bouding area displayed on the screen for the indicator of choice. Only the pixels inside this polygonal area are used to compute the color model for the indicator. The computation is done in the same way the background model was produced. Usually the color model for the indicator will be dominated by a different color in color space than the background. Once a color model for the indicator has been determined, this model will not have to be recalculated unless a pointer with a significantly different color is employed.

Once both the screen background and indicator models are determined, the tip of the indicator can be located and its image coordinates can be mapped to screen coordinates. As indicated earlier, this first involves segmenting the indicator from the screen background in an image of the screen on which the user is pointing. To this end, a standard Bayes classifier (or the like) is used to segment the indicator from the screen background. A Bayes classifier generally operates by calculating, given a pixel color intensity, whether the pixel is more probably a foreground (indicator) or a background (screen) pixel. This classifier operates on the presumption that the screen background pixels are likely to have a mean pixel intensity that differs significantly from the mean pixel intensity of the indicator (such as the finger). If the extracted models of the foreground and background are split into separate RGB channels, the Bayes classifier determines the probability a given pixel color is a background pixel for each channel and these probabilities are multiplied together. The classifier also determines the probability a given pixel is a foreground pixel for each channel and multiplies the probabilities together. Next, the background pixel probability product is divided by the foreground pixel probability product. If this quotient is greater than one then the pixel is determined to be a background pixel, otherwise it is determined to be a foreground or indicator pixel.

The indicator tip location should be consistently determined. In the system and method according to the present invention, the tip point is defined as the intersection of the indicator's centerline and its boundary along the direction that the indicator is pointing. This definition has been simplified by allowing the indicator to point only in an upwards direction. The system and method according to the present invention robustly finds the centerline of the indicator and its intersection with the upper boundary of the indicator. To elaborate, a cumulative total of the number of pixels that belong to the foreground are calculated on a scan line by scan line basis starting at the top of the image containing the indicator. The number of pixels representing foreground pixels in each scan line are next analyzed to determine the scan line where the foreground pixels first appear and increase in cumulative total thereafter (i.e., representing a step). The identified scan line roughly corresponds to where the indicator tip location may be found. Next, a number of lines above and below the identified line (e.g., ±15 lines) are selected and each is scanned to find the start and end of the foreground pixels (if any) in the horizontal direction. In addition, the center point of each series of foreground pixels along each of the scan lines is determined and a line is fit through these points. The pixel corresponding to the indicator tip location is then determined by scanning all pixels within the previously identified indicator window (e.g., ±15 lines) to find the boundary pixels. The pixel corresponding with the tip of the indicator is the boundary pixel where the previously determined centerline intersects the boundary of the indicator. Finally, a Kalman filter may be used to filter out noise in the determined finger tip location.

Once the pixel of the image corresponding to the pointer tip (and so its image coordinates) has been determined, this location is mapped to the corresponding screen coordinates. This is done using the previously determined homography to identify the rough screen coordinates associated with the pointer tip image coordinates. The rough coordinates are then refined using the residual vector applicable to the identified screen coordinates. The resulting location is deemed the place where the user is pointing to the screen. The screen coordinates of the tip point are then used to control the position of the system indicator, which is sometimes referred to as a cursor.

The system and method according to the present invention has the advantages of being fast, accurate and reliable. Additionally, it allows a touch screen to be created relatively inexpensively, especially when compared to present day touch screen implementations.

DESCRIPTION OF THE DRAWINGS

The specific features, aspects, and advantages of the present invention will become better understood with regard to the following description, appended claims and accompanying drawings where:

DETAILED DESCRIPTION OF THE PREFERRED EMBODIMENTS

In the following description of the preferred embodiments of the present invention, reference is made to the accompanying drawings, which form a part hereof, and which is shown by way of illustration of specific embodiments in which the invention may be practiced. It is understood that other embodiments may be utilized and structural changes may be made without departing from the scope of the present invention.

Exemplary Operating Environment

Figure 1:
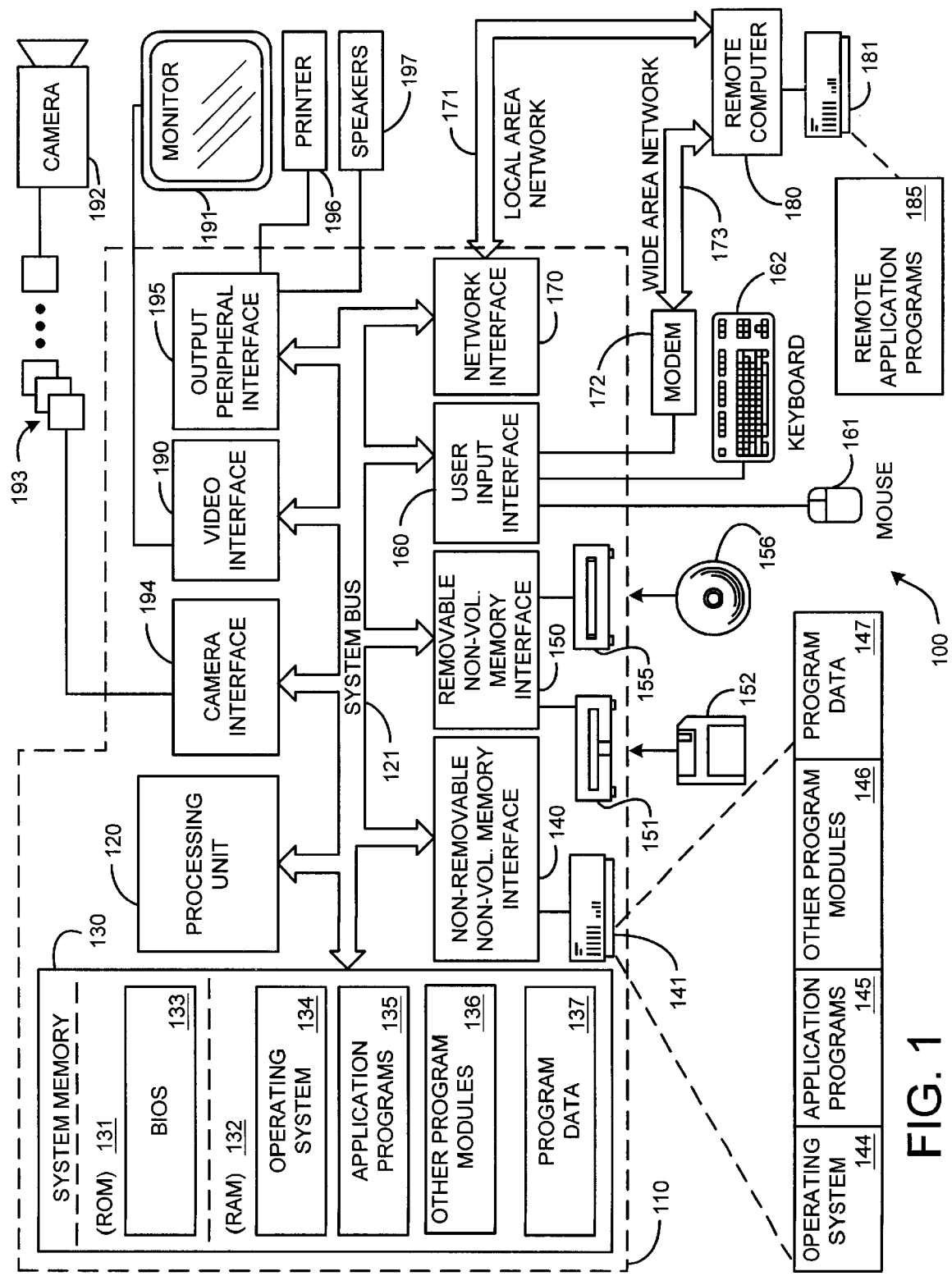
FIG. 1 is a diagram depicting a general purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 132 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

System Overview

Figure 2:
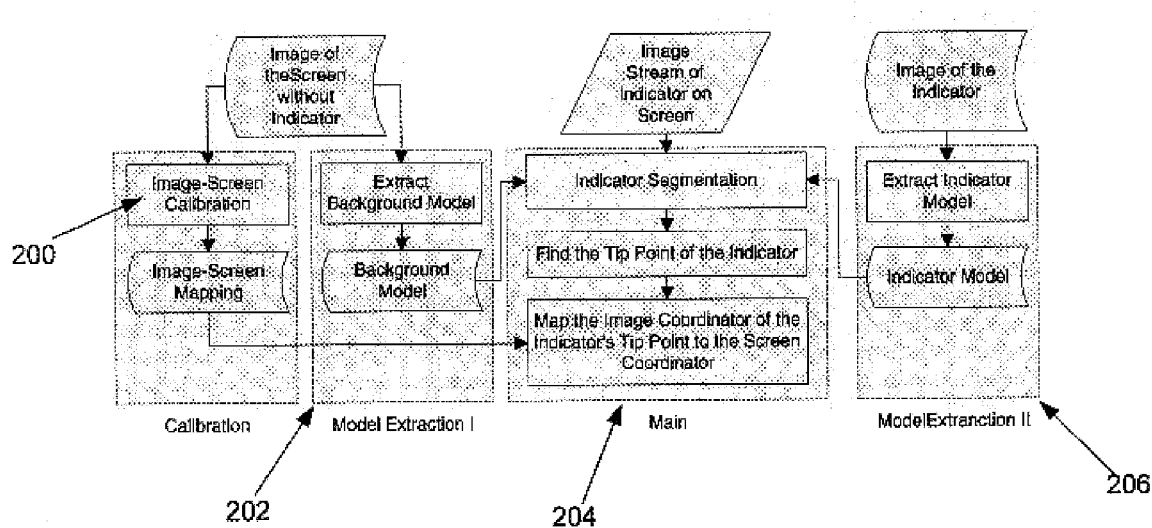
FIG. 2 is a functional diagram of the system and method according to the present invention.

The present invention turns a regular computer monitor screen into a touch screen using an ordinary camera. It includes an image-screen mapping procedure to correct for the non-flatness of the computer screen. Referring to FIG. 2, four dashed boxes represent the four major parts of the system. From left to right, these boxes are the Calibration Block 200, Model Extraction Block I 202, Main Block 204 and Model Extraction Block II 206, respectively. The Calibration Block 200 is used to establish mapping between the image coordinates and the screen coordinates. This mapping is then used in the Main Block 204 to find the corresponding screen coordinates for the indicator tip point once its image coordinates are estimated. The Model Extraction Blocks I and II (202 and 206) depicted in FIG. 2 are used to extract background model and foreground models of the screen and indicator, respectively. The Main Block 204 is the core of the system and is discussed in more detail below.

Still referring to FIG. 2, initially an image of the computer screen without the indicator is input into the Calibration Block 200, and an image to screen calibration takes place. An image of the screen without the indicator is also input into the Model Extraction Block I 202 and a background model is extracted from this image. Additionally, an image of the indicator superimposed on the screen is input into the Model Extraction Block II 206 and an indicator model is extracted. The image screen-mapping, background model and indicator model are then input into the Main Block 204. The Main Block 204 is the kernel of the system. Its function is to locate the tip point of the indicator (e.g., a finger, pen, etc.) in an image of the screen and map its image coordinates to the screen coordinates. The task of tip point location involves two processes. The first process is to segment the indicator from the background. The second is to find the tip point of the indicator. The segmentation process requires that color models for both the background and the indicator be calculated.

Figure 3:
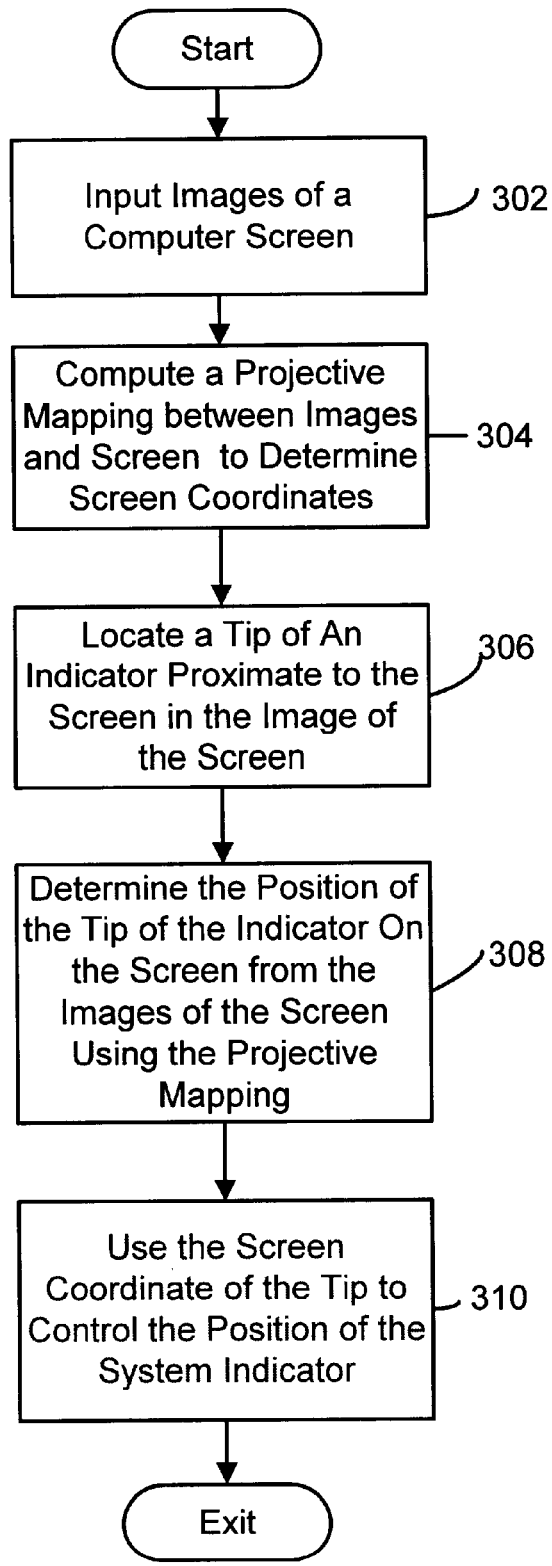
FIG. 3 is a flow diagram depicting an overview of the process whereby a normal computer screen is turned into a touch-screen by using a camera to determine the position of an indicator on a screen.

In general, in the simplest terms, as shown in FIG. 3, the system and process according to the present invention inputs images of a computer screen into a computer (process action 302). A projective mapping between the images and the computer screen is then computed to determine the screen coordinates, as shown in process action 304. A tip of an indicator proximate to the screen is then located using the aforementioned projective mapping (process action 306). Then, as shown in process action 308, the position of the tip of the indicator on the screen is determined from the images of the screen using this projective mapping. Finally, the screen coordinates of the tip are used to control the position of the system indicator, such as the cursor or pointer (process action 310).

The system setup essentially involves only positioning a camera so as to view the screen of a computer monitor. Ideally, the camera views the screen from a point along a line normal to the center of the screen. However, as this will likely interfere with the user who typically sits in front of the computer monitor, the camera can be shifted away from the normal line to get it out of the way of the user. The camera should not be moved too far away from the normal line, however, or errors will be introduced in the process which is to be described shortly. It is believed that the camera can be positioned up to about 30 degrees off of the aforementioned normal line in any direction and still provide error-free performance. In addition to the camera placement, another important factor in reducing imaging errors is the scale of the image captured by the camera. Essentially, it is preferred that the camera zoom be set such that the entire screen of the monitor is depicted. In addition, it is preferred that as much of the image as possible depict the screen so as to minimize the amount of non-screen background in the image. It is noted that in a typical PC setup, a computer mouse or keyboard is used to move a cursor across the monitor screen. In the present system and method, an indicator or pointer, such as the user's finger placed against the screen, is used to move the cursor. To this end, the computer system is preferably modified such that when the aforementioned indicator is detected, the control of the cursor by the mouse or keyboard is suspended. When the indicator is not detected against the screen, the mouse or keyboard would be used to move the cursor as usual.

Calibration

The purpose of the calibration procedure as indicated above is to establish a projective mapping between the image coordinates and the screen coordinates. It is noted that the calibration procedure need only be done once unless the camera of monitor are moved, in which case the calibration must be re-done. If the screen is flat, the plane perspectivity from the screen plane and its 2D projection on the image plane is described by a homography, i.e., a 3×3 matrix defined to a certain scale. Such a homography once established can be used to map the image coordinates to the screen coordinates. This homography can easily be determined from four pairs of image-screen correspondences. The correspondences are not difficult to obtain because the screen coordinates can be chosen as the four corners of the screen and their corresponding image points can either be detected automatically (e.g., via an edge detection procedure) or can be specified by the user (e.g., by selecting points on a displayed version of the image of the screen).

Figure 4:
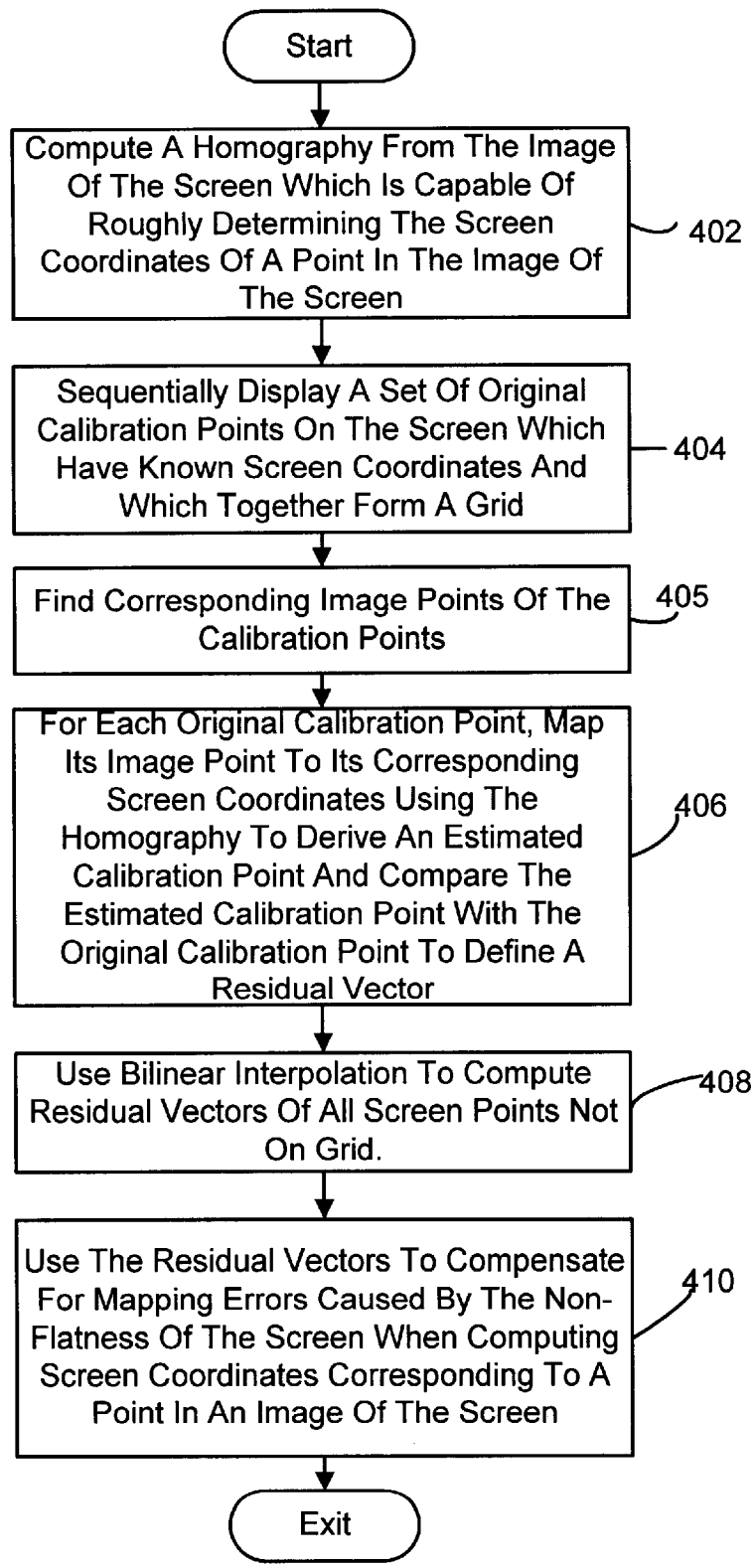
FIG. 4 is a flow diagram depicting a system and method according to the present invention for correcting for the curvature of a non-flat computer screen.

In some cases, however, screens are not flat. This problem has been addressed as follows, as depicted in the flow diagram shown in FIG. 4. To correct for the curvature of the screen, first a homography is computed as before, as indicated in process action 402. Since the screen is not actually flat, the computed homography is just an approximation. Second, as shown in process action 404, a series of dots forming a grid (referred to as calibration points hereafter) whose center coordinates are known in the screen plane are displayed on the screen. Preferably, these dots are displayed one at a time in sequence (e.g., from left to right starting with the top row of the grid). A dot on the screen is usually projected in the image plane as an ellipse since the camera will typically be viewing the screen from an offset angle. The centroid of an ellipse can easily be computed. As the extent of an ellipse is small in the present case, the centroid of the ellipse can be considered to be the projection of the center of the corresponding dot. As each calibration point appears on the screen, an image of the screen is captured. The ellipse representing the dot in the image is found in the image and the coordinates of its centroid are calculated, as shown in process action 405. This can be accomplished using standard techniques for segmenting foreground pixels, including the color segmentation procedure that will be discussed later. If color segmentation is employed, then the color of the dot displayed on the screen should be a color clearly distinguishable from that of the rest of the screen. It is also noted that to speed up the process of locating the dot, the search of the image can be limited to a region of the image surrounding the point where the center of the displayed dot is likely to be seen based on previously derived homograph. As indicated in process action 406, the centroid of the ellipse representing the displayed dot in the camera image is then mapped back to the screen coordinates also using the previously computed homography. These mapped points are called estimated calibration points. Each estimated calibration point is compared to the screen coordinates of the original calibration point. As further indicated in process action 406, the difference between the original and the estimated calibration points defines a residual vector. Once each dot in the grid of dots is displayed and analyzed, the result is a grid of residual vectors. Bilinear interpolation is then used to compute the residual vectors of all screen points (e.g., pixels) not on the grid, as shown in process action 408. The resulting residual vector field is used to compensate for mapping errors caused by the non-flatness of the screen for all points on the screen (process action 410). Finally, it is noted that while the foregoing procedure need not be implemented if a flat or nearly flat screen is involved, it may still prove advantageous to do so. Since the homography is computed using just four point correspondences, any inaccuracies in the point coordinates will result in an inaccurate homography. The foregoing compensation procedure corrects for any inaccuracies because many more points are compared.

Background and Foreground Model Extraction

The aforementioned procedures for extracting a background and foreground model, preferably employ a color segmentation technique. Sometimes it is difficult to separate the indicator, such as a finger, from the background screen because the screen contents change frequently. However, it has been observed during experimentation, that images of screen pixels have some degree of invariance in the color space. Particularly, they are dominated by blue colors. This observation forms the base of the segmentation procedure described as follows.

Figure 5:
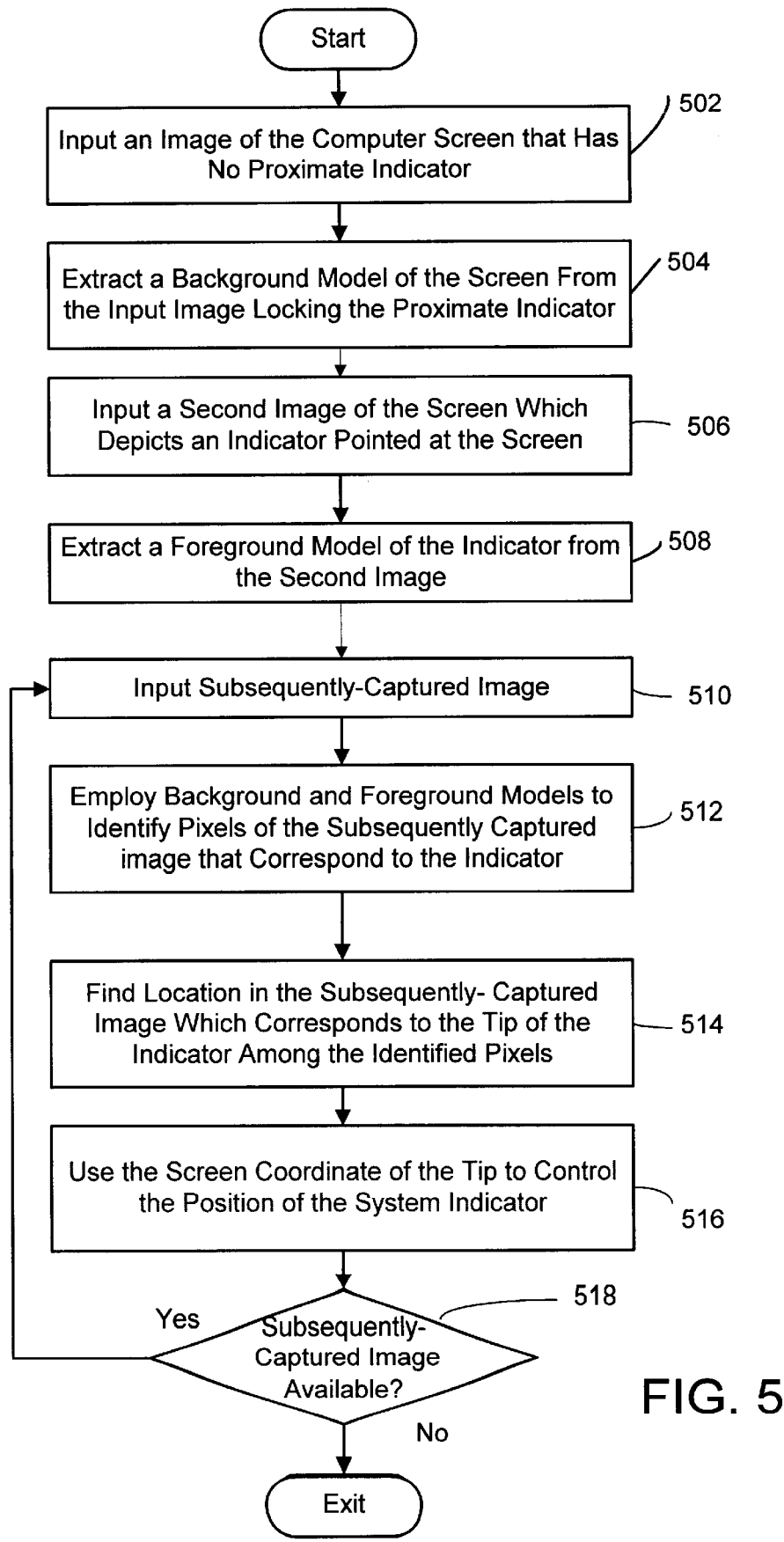
FIG. 5 is a flow diagram depicting a more detailed version of the system and process shown in FIG. 3.

First, as shown in FIG. 5 process actions 502 through 504, a color model for the screen without the indicator (e.g., finger, pen, etc.) is computed. This is done by capturing an image of the screen (without an indicator superimposed) while it displays the colors typical of the screen images used in the program for which the present invention is being used to simulate a touch screen (process action 502). The captured image is used to compute a background model for the screen, as shown in process action 504. To this end, all of the pixels in the image are histogrammed—namely, for each pixel its color intensity is placed in the proper bin (of a preferred possible 256 intensity levels). This is preferably done for each of the red, green and blue (RGB) channels thus generating three separate histograms. Alternately, one histogram could be generated using some joint space representation of the channels. Once the histogramming has taken place, a Gaussian distribution for each histogram is calculated to provide the mean pixel intensity and the variance therefrom. Thus, the pixel intensity of the background and the variance therefrom are known for the purpose of determining which pixels are background pixels.

Once the modeling of the background of the screen has been completed, as shown in process actions 506 and 508, the model for the indicator or pointer (e.g., finger, pen, etc.) is computed in order to separate the indicator from the background. This is done by asking the user to point to a polygonal area displayed on the screen using the indicator of choice. Only the pixels inside this polygonal area are used to compute the color model for the indicator. The computation is done in the same way the background model was produced. Usually the color model for the indicator will be dominated by a different color in color space than the background. For instance, skin color is usually dominated by yellow. Once a color model for the indicator has been determined, this model will not have to be recalculated unless a pointer with a significantly different color is employed.

Indicator Segmentation

Once both the screen background and indicator models are produced, the system is ready to locate the tip of the indicator and to map its image coordinates to screen coordinates. In general, this involves inputting a subsequently-captured image as shown in process action 510. The background and foreground models are then employed to identify pixels of the subsequently-captured image that correspond to the indicator (process action 512). The location of the subsequently-captured image which corresponds to the tip of the indicator among the identified pixels is then found (process action 514). The screen coordinates of the tip point are then used to control the position of the system indicator (process action 516). If there are additional subsequently-captured images available they are processed in a similar manner to constantly update the location of the indicator tip on the screen (process action 518). This process is described in more detail below.

As indicated earlier, the location of the indicator on the screen first involves segmenting the indicator from the screen background in an image of the screen on which the user is pointing. To this end, a standard Bayes classifier (or the like) is used to segment the indicator from the screen background. A Bayes classifier generally operates by calculating, given a pixel color intensity, whether the pixel is more probably a foreground (indicator) or a background (screen) pixel. This classifier operates on the presumption that the screen background pixels are likely to have a mean pixel intensity that differs significantly from the mean pixel intensity of the indicator (such as the finger). If the extracted models of the foreground and background are split into separate RGB channels, the Bayes classifier determines the probability a given pixel color is a background pixel for each channel and these probabilities are multiplied together. Likewise, the classifier determines the probability a given pixel is a foreground pixel for each channel and multiplies the probabilities together. Next, the background pixel probability product is divided by the foreground pixel probability product. If this quotient is greater than one then the pixel is determined to be a background pixel, otherwise it is determined to be a foreground or indicator pixel. This relationship may be expressed by the following equation:

$$\frac{\prod p(c/B)}{\prod p(c/F)} > 1$$

Robust Finger Tip Locating

Figure 6:
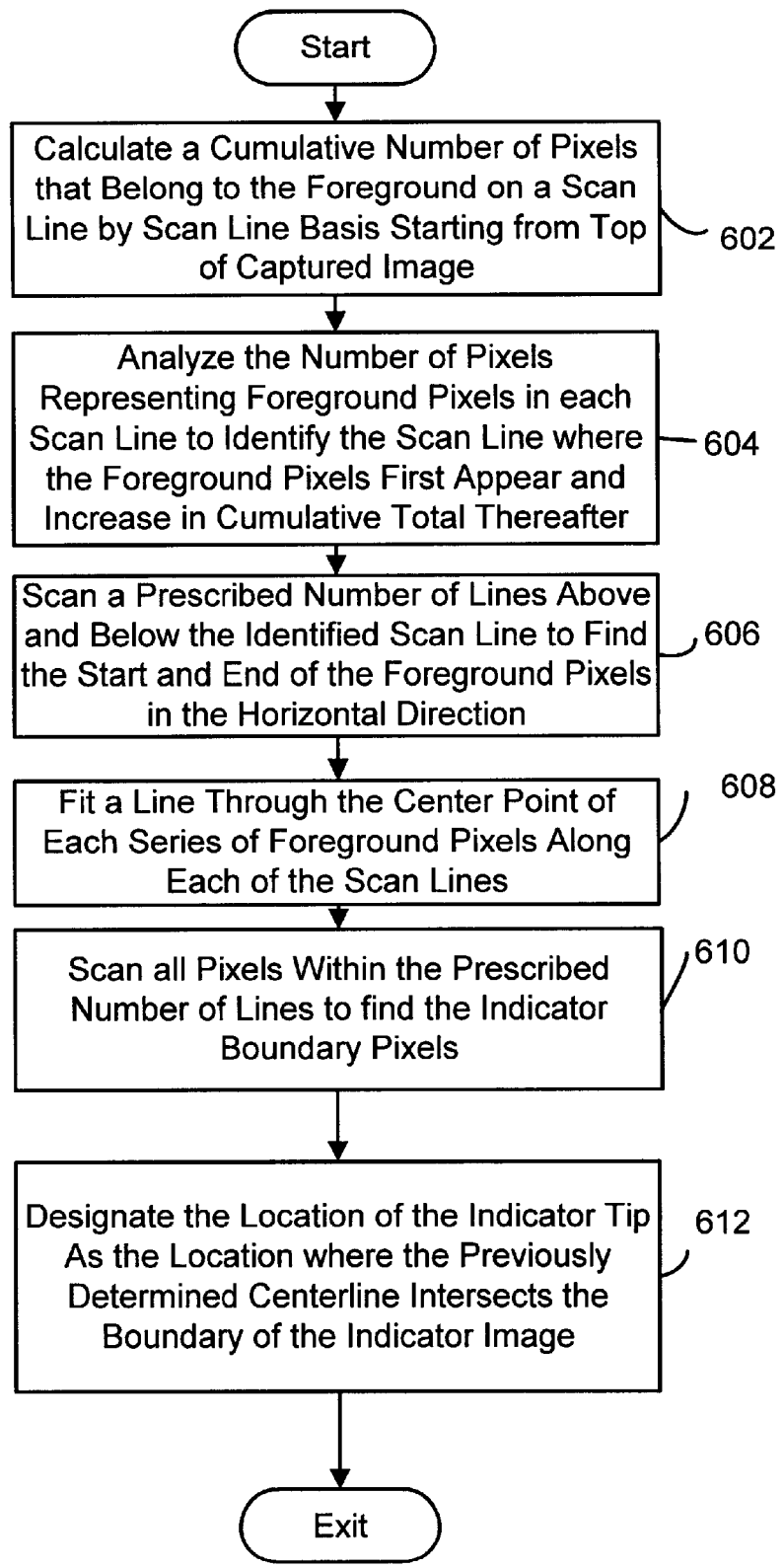
FIG. 6 is a flow diagram depicting the system and method according to the present invention to determine the location of an indicator tip.
Figure 7:
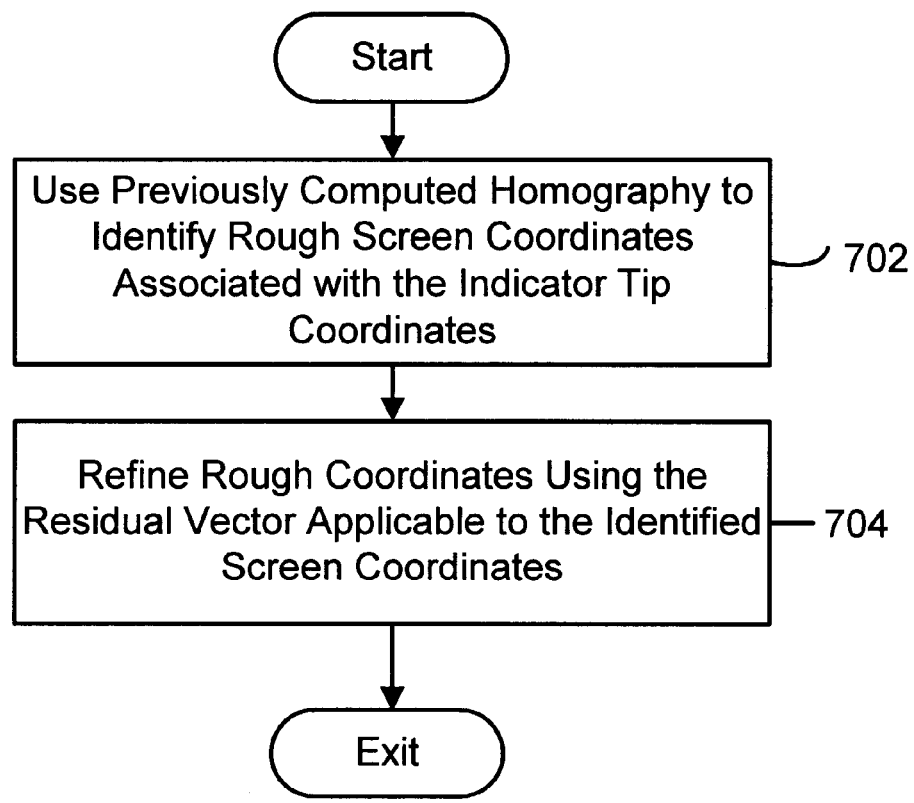
FIG. 7 is a flow diagram depicting the system and method according to the present invention for mapping the screen coordinates of the indicator's tip.

It is desired that the finger tip location be consistently determined. In the system and method according to the present invention, the tip point is defined as the intersection of the indicator's centerline and its boundary along the direction that the indicator is pointing. This definition has been simplified by allowing the indicator to point only in an upwards direction. The system and method according to the present invention robustly finds the centerline of the indicator, as well as its intersection with the upper boundary of the indicator. To elaborate, as shown in FIG. 6, a cumulative total of the number of pixels that belong to the foreground are calculated on a scan line by scan line basis starting at the top of the image containing the indicator (process action 602). It is already known which pixels are foreground and which are background from the indicator segmentation procedure. Thus, the scanning process is a straightforward matter. The number of pixels representing foreground pixels in each scan line are next analyzed to determine the scan line where the foreground pixels first appear and increase in cumulative total each line thereafter (i.e., representing a step), as shown in process action 604. The identified scan line roughly corresponds to where the indicator tip location may be found. Next, as shown in process action 606, a number of lines above and below the identified line (e.g., ±15 lines) are selected and each is scanned to find the start and end of the foreground pixels (if any) in the horizontal direction. In addition, the center point of each series of foreground pixels along each of the scan lines is determined and a line is fit through these points (process action 608). The pixel corresponding to the indicator tip location is then determined by scanning all pixels within the previously identified indicator window (e.g., ±15 lines) to find the boundary pixels, as shown in process action 610. Specifically, it is preferred that it be determined for each pixel whether the eight surrounding or neighborhood pixels are homogeneous or not. That is, whether one or more of the eight neighboring pixels is different with respect to being a foreground or background pixel from the pixel under consideration. Each pixel having a non-homogenous neighborhood is considered a boundary pixel. The pixel corresponding with the tip of the indicator is the boundary pixel where the previously determined centerline intersects the boundary of the indicator (as shown in process action 612). Finally, a Kalman filter may be used to filter out noise in the determined finger tip location.

Mapping Screen Coordinates of the Indicator Tip

Once the pixel of the image corresponding to the pointer tip (and so its image coordinates) has been determined, the final action is to map this location to the corresponding screen coordinates. This is accomplished using the previously computed homography to identify the rough screen coordinates associated with the pointer tip image coordinates (process action 702). The rough coordinates are then refined using the residual vector applicable to the identified screen coordinates (process action 704). The resulting location is deemed the place where the user is pointing to the screen. The screen coordinates of the tip can then be used to control the position of the system indicator or system cursor.

The system and method according to the present invention has the advantages of being fast, accurate and reliable. It also allows a touch screen to be created relatively inexpensively, especially when compared to present day touch screen implementations.

While the invention has been described in detail by specific reference to preferred embodiments thereof, it is understood that variations and modifications thereof may be made without departing from the true spirit and scope of the invention. For example, the system and method described above is not limited to just a finger or pen being used as an indicator.

Wherefore, having thus described the present invention, what is claimed is:

1. A computer-implemented process for transforming a computer screen into a touch screen using a camera, comprising using a computer to perform the following process actions:

inputting images of the computer screen;
computing a projective mapping between the images and the screen which is capable of determining the screen coordinates of a point in the images, wherein the process action of computing a projective mapping between the image coordinates and the screen coordinates, comprises an action of determining a homography from at least four pairs of image-screen correspondences;
locating a tip of an indicator in said images, said indicator being superimposed on the screen in the image;
determining the position of the tip of the indicator on the screen from the images of the screen using said projective mapping; and correcting for the curvature of the screen said connection comprising:
sequentially displaying a set of original calibration points on the screen which have known screen coordinates and which together form a grid;
capturing each of the calibration points in an image;
for each displayed original calibration point,
mapping said original calibration point as depicted in the image to its corresponding screen coordinates using the projective mapping to derive an estimated calibration point,
comparing the estimated calibration point with the original calibration point to define a residual vector;
using bilinear interpolation to compute residual vectors for all screen points not associated with a displayed calibration point to create a residual vector field;
identifying the rough location of the indicator tip using the projective mapping; and
refining the location of the indicator tip by applying the residual vector associated with the rough location.

2. The process of claim 1, wherein the process action of determining a homography from at least four pairs of image-screen correspondences comprises a process action of having a user choose the screen coordinates as the four corners of the screen and selecting corresponding points on a displayed version of the image of the screen.

3. The process of claim 1, wherein the process action of determining a homography from at least four pairs of image-screen correspondences comprises a process action of having a user choosing the screen coordinates as the four corners of the screen and detecting corresponding points on an image of the screen via an edge detection procedure.

4. The process of claim 1, wherein the process action of locating the tip of the indicator in the inputted images, comprises the actions of:

inputting an image of the computer screen lacking a depiction of an indicator pointed at the screen;
extracting a model of the screen, referred to as a background model, from the input image lacking the depiction of the indicator, said background model being indicative of the screen when no indicator is pointed at it;
inputting a second image of the screen which depicts an indicator pointed at the screen;
extracting a model of the indicator, referred to as a foreground model, from the second image;
inputting one or more subsequently-captured images of the screen; and
for each subsequently-captured image,
employing the background and foreground models to identify pixels of the subsequently-captured image that correspond to the indicator,
finding a location in the subsequently-captured image which corresponds to the tip of the indicator among the identified pixels.

5. The process of claim 4 wherein the process action of extracting a background model of the screen comprises:

capturing an image of the screen while it displays colors typical of the screen images used;
histogramming all pixels in the image on the basis of pixel color intensity; and
calculating a Gaussian distribution for the histogram to determine the mean pixel intensity and the variance therefrom.

6. The process of claim 4 wherein the process action of extracting a foreground model further comprises:

displaying an area on the screen;
having a user point to a said displayed area using said indicator;
capturing an image of the screen while the user is pointing to said displayed area;
histogramming all pixels of the captured image in the displayed area on the basis of pixel color intensity; and
calculating a Gaussian distribution for the histogram to determine the mean pixel intensity and the variance therefrom.

7. The process of claim 4 wherein the process action of employing the background and foreground models to identify pixels of the subsequently-captured image that correspond to the indicator comprises the process actions of:

for each pixel,
determining the probability it is a background pixel using the background model;
determining the probability it is a foreground pixel using the foreground model;
dividing the probability it is a background pixel by the probability it is a foreground pixel and if this number is greater than one designating the pixel as a background pixel, and if this number is less than one designating this pixel as a foreground pixel.

8. The process of claim 1 wherein the process action for sequentially displaying the set of original calibration points on the screen comprises sequentially displaying a set of circular dots, the centers of which correspond to the screen coordinates of each original calibration point, wherein each dot appears as an ellipse in the image of the dot; and wherein the process action for mapping the original calibration point as depicted in the image to its corresponding screen coordinates comprises using the centroid of the ellipse associated with the calibration point as the calibration point depicted in the image.

9. The process of claim 1 wherein the action of finding the location of the indicator comprises the actions of:

calculating a cumulative total number of pixels that belong to the foreground on a scan line by scan line basis starting from the top of the captured image;
analyzing the number of pixels representing foreground pixels in each scan line to identify the scan line where the foreground pixels first appear and increase in cumulative total thereafter, said identified scan line being designated as the preliminary tip location scan line;

scanning a prescribed number of lines above and below the identified tip location scan line to find the start and end of the foreground pixels in the horizontal direction;

fitting a line through the center point of each series of foreground pixels along each of the scan lines;

scanning all pixels within the prescribed number of lines to find the indicator boundary pixels; and designating the location of the indicator tip as the location where the previously determined centerline intersects a boundary pixel of the indicator in the image.

10. The process of claim 9 further comprising the process action of using a Kalman filter to refine indicator tip location.

11. The process of claim 9 wherein the process action of determining the position of the tip of the indicator on the screen from the images of the screen comprises an action of mapping the location of the pixel of the image corresponding to the indicator tip to the corresponding screen coordinates using the projective mapping.

12. A computer-readable medium having computer-executable instructions for transforming a computer screen into a touch screen using a camera, said computer-executable instructions comprising:

inputting images of the computer screen;

computing a homography which is capable of determining the screen coordinates of a point in the images, said homography being computed from at least four pairs of image-screen point correspondences;

locating a tip of an indicator in said images, said indicator being superimposed on the screen in the image;

determining the position of the tip of the indicator on the screen from the images of the screen using said homography; and refining the determined position of the tip of the indicator on the screen by correcting for errors in the homography said correcting comprising:

sequentially displaying a set of original calibration points on the screen which have known screen coordinates and which together form a grid;

capturing each of the calibration points in a separate image;

for each displayed original calibration point,
mapping said original calibration point as depicted in the image to its corresponding screen coordinates using the homography to derive an estimated calibration point,
comparing the estimated calibration point with the original calibration point to define a residual vector;

using bilinear interpolation to compute residual vectors for all screen points not associated with a displayed calibration point to create a residual vector field;

identifying the rough location of the indicator tip using the projective mapping; and refining the location of the indicator tip by applying the residual vector associated with the rough location.

13. The computer-readable medium of claim 12 wherein the sub-module for sequentially displaying the set of original calibration points on the screen comprises sequentially displaying a set of circular dots the center of which correspond to the screen coordinates of the original calibration point, wherein said dot appears as an ellipse in the image of the dot; and wherein the sub-module for mapping the original calibration point as depicted in the image to its corresponding screen coordinates comprises using the centroid of the ellipse associated with the calibration point as the calibration point depicted in the image.

14. A computer-implemented process for compensating for the non-flatness of a computer monitor screen when computing screen coordinates corresponding to a point in an image of a screen, comprising using a computer to perform the following process actions:

computing a homography from the image of the screen which is capable of roughly determining the screen coordinates of a point in the image of the screen;

sequentially displaying a set of original calibration points on the screen which have known screen coordinates and which together form a grid;

for each displayed original calibration point,
mapping said original calibration point as depicted in the image to its corresponding screen coordinates using the homography to derive an estimated calibration point,
comparing the estimated calibration point with the original calibration point to define a residual vector; and using the residual vectors to compensate for mapping errors cause by the non-flatness of the screen when computing screen coordinates corresponding to a point in an image of the screen.

15. The process of claim 14, wherein the process action of using the residual vectors to compensate for mapping errors comprises the process actions of:

using bilinear interpolation to compute residual vectors for all screen points of interest not associated with a displayed calibration point;

identifying the rough screen coordinates of a point in the image using the homography; and refining the location of the screen coordinates of the point in the image by applying the residual vector associated with the rough screen coordinates of the point.

* * * * *